United States Patent [19]

McCoin

[11] 4,192,201
[45] Mar. 11, 1980

[54] TRACTION CONTROLLED IN-LINE TRANSMISSION

[75] Inventor: Dan K. McCoin, El Paso, Tex.

[73] Assignee: Bales-McCoin Research, Inc., El Paso, Tex.

[21] Appl. No.: 787,372

[22] Filed: Apr. 14, 1977

Related U.S. Application Data

[63] Continuation-in-part of Ser. No. 716,341, Aug. 20, 1976.

[51] Int. Cl.² ............................................. F16H 37/06
[52] U.S. Cl. ........................................ 74/690; 74/740; 74/191
[58] Field of Search ................. 74/690, 691, 740, 191

[56] References Cited

U.S. PATENT DOCUMENTS

3,820,416 6/1974 Kraus ..................................... 74/690

FOREIGN PATENT DOCUMENTS

169463 4/1922 United Kingdom ....................... 74/690

Primary Examiner—C. J. Husar
Assistant Examiner—Frank McKenzie
Attorney, Agent, or Firm—Clarence A. O'Brien; Harvey B. Jacobson

[57] ABSTRACT

A variable diameter traction roller is connected in line with high torque transmitting gearing of the planetary type to control the over-all transmission drive ratio through an axially shiftable, driven traction roller. The driven traction roller is mounted on a pivotally displaceable bracket through which a tension device exerts a variable contact force and the pitch line angle between traction rollers is varied by a limited amount.

10 Claims, 6 Drawing Figures

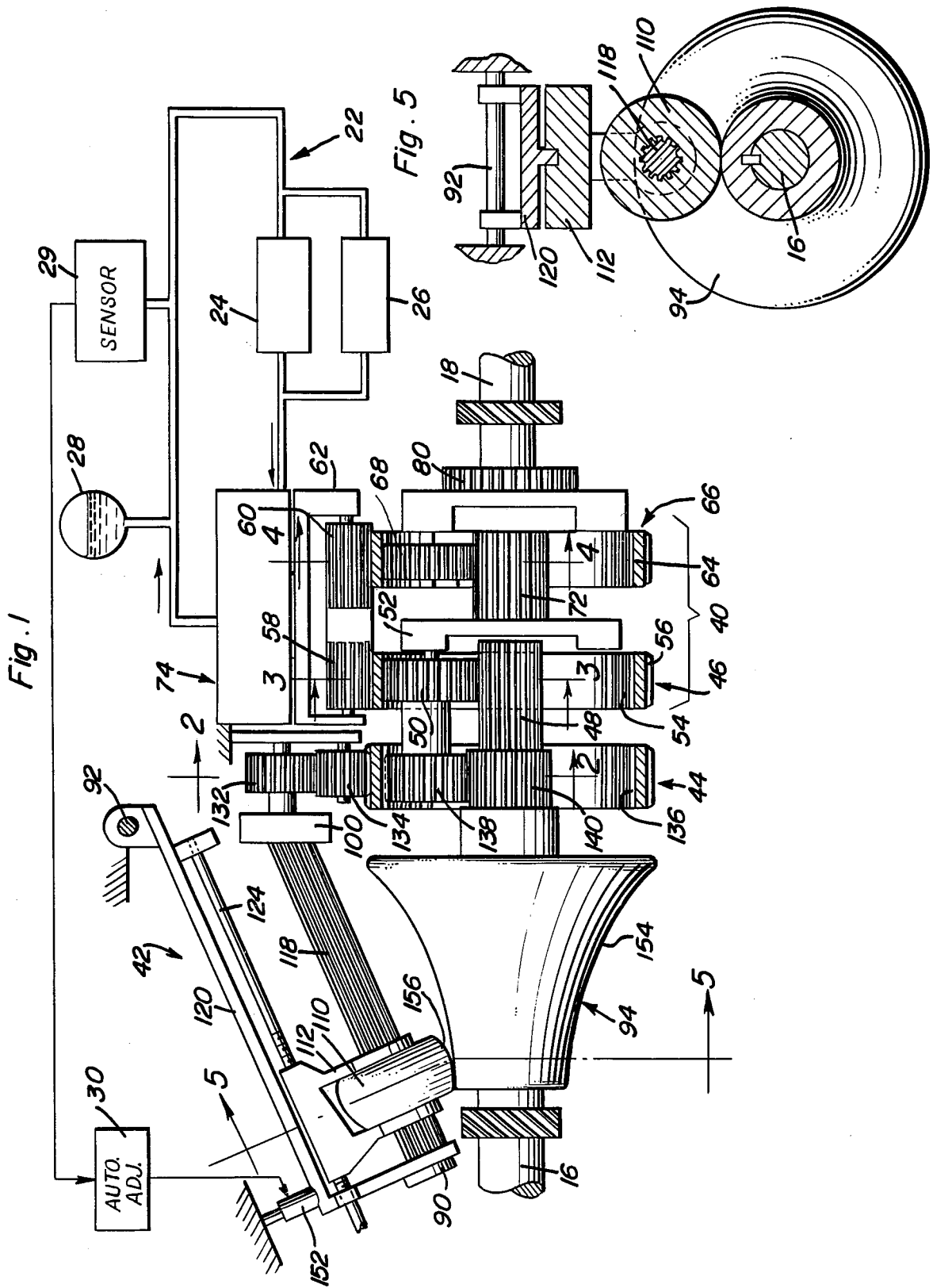

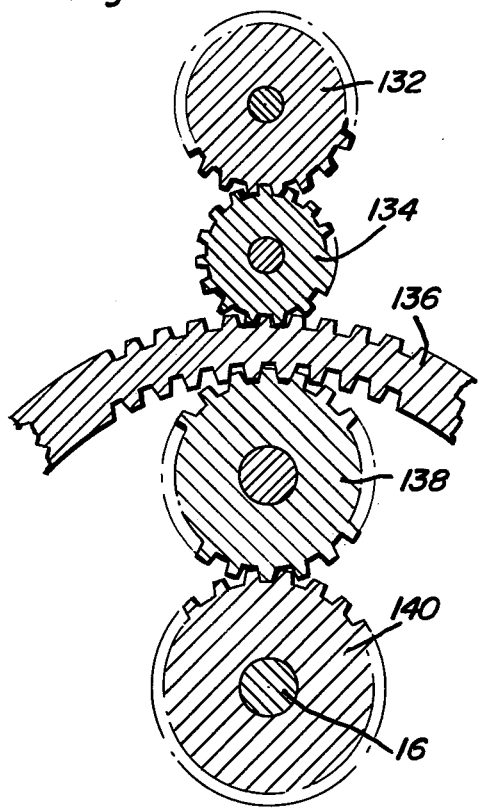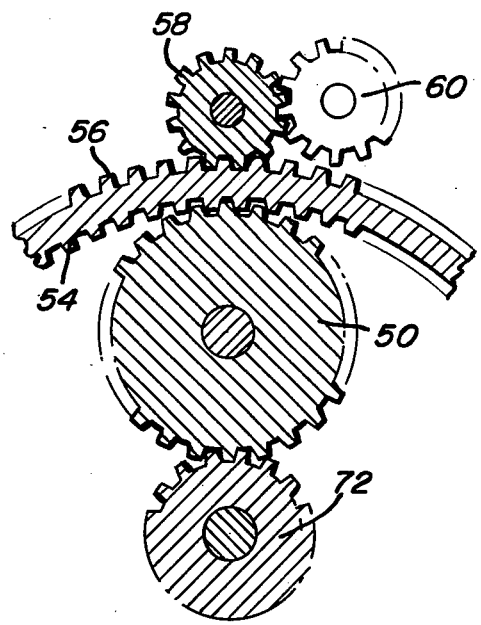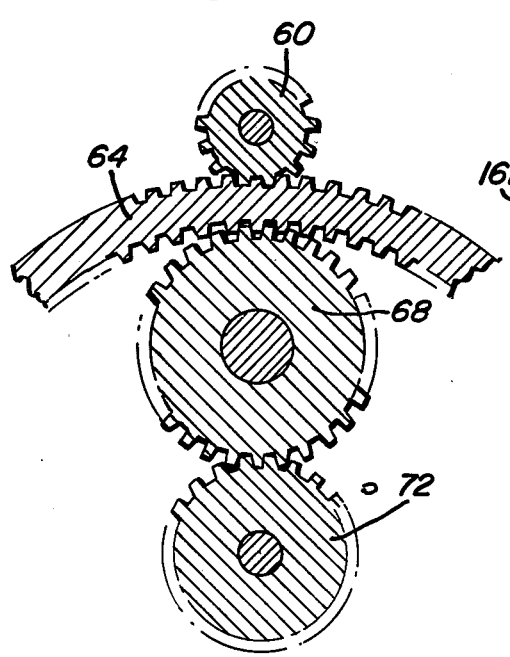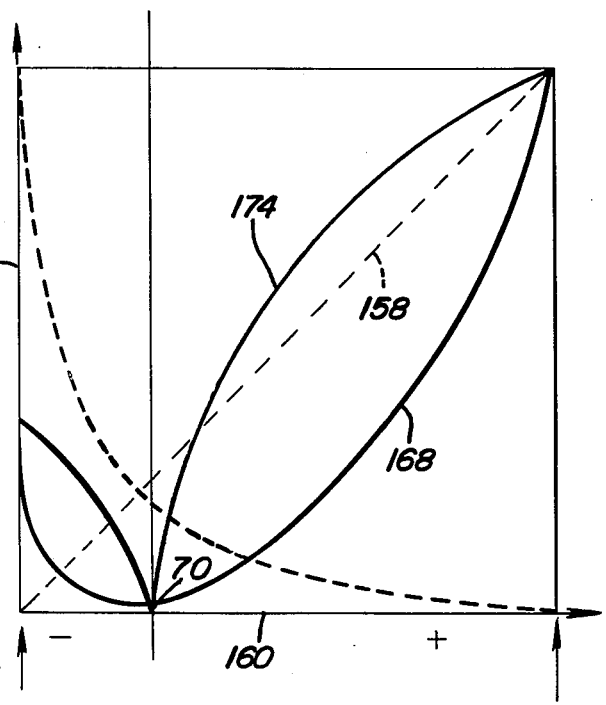

TRACTION CONTROLLED IN-LINE TRANSMISSION

BACKGROUND OF THE INVENTION

This invention relates to variable speed transmissions of the type disclosed in my prior copending application, Ser. No. 716,341, filed Aug. 20, 1976, with respect to which the present application is a continuation-in-part.

In my prior copending application, the transmission disclosed featured a traction drive assembly through which a small fraction of the total torque transmitted by the transmission is utilized to vary and establish the over-all transmission drive ratio in a practical and efficient manner by providing a favorable relationship between the drive ratio and the contact pressure in the traction drive assembly. The traction drive assembly is positioned in laterally spaced relationship to the transmission gearing and includes a driven traction roller axially shiftable along a fixed path parallel to the common rotational axis for the transmission input and output shafts. The other traction roller of variable diameter is mounted on a pivotally displaceable bracket for limited corrective displacement during axial shift of the driven roller engaged therewith to vary the drive ratio. The foregoing arrangement has certain spatial and structural drawbacks. It is, therefore, an important object of the present invention to provide an improved form of transmission of the foregoing type that avoids such drawbacks.

SUMMARY OF THE INVENTION

In accordance with the present invention, a traction drive assembly includes a variable diameter roller driven by the input shaft about the rotational axis common to the input and output shafts. A driven traction roller is mounted on a pivotal bracket and is axially shiftable along its spline shaft to change the transmission drive ratio. Contact pressure between the rollers is changed as a function of the driven roller position and the pitch line curvatures of the rollers at the contact zone. The contact pressure is thereby varied in an optimum manner characterized by a minimum pressure in the neutral position of the driven roller as predetermined by the drive relationships in the gearing which is axially aligned with the variable diameter traction roller. As an alternative, the axially shiftable roller could be rotatable about a fixed axis common with the input and output shafts while the variable diameter roller is mounted at an angle thereto on the bracket. In the latter arrangement, a plurality of variable diameter rollers could be mounted by a plurality of brackets for drive engagement with the axially shiftable roller in order to distribute the torque load and thereby increase the load capacity of the transmission. Power transmission through the gearing may be interrupted by release of a hydrostatic brake holding a floating carrier for a gear train interconnecting orbit gears in the high torque transmitting gear assembly of the transmission.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a somewhat simplified and partially schematic side elevational view of a transmission constructed in accordance with the present invention.

FIGS. 2, 3 and 4 are enlarged partial section views of the gearing taken substantially through planes indicated by section lines 2—2, 3—3 and 4—4 in FIG. 1.

FIG. 5 is an enlarged partial section view of the traction drive assembly taken substantially through a plane indicated by section line 5—5 in FIG. 1.

FIG. 6 is a graph showing various operational relationships associated with the transmission of FIG. 1.

DESCRIPTION OF THE PREFERRED EMBODIMENT

Referring now to FIG. 1 in particular, the transmission 12 includes an input shaft 16 and an axially aligned output shaft 18. The input shaft is directly connected to an infinitely variable traction drive assembly generally referred to by reference numeral 42 through which selection of the over-all transmission drive ratio is effected. A power transmitting gear assembly 40 drivingly interconnects the input and output shafts while torque bias control means 44 drivingly interconnects the variable traction drive assembly 42 with the power transmitting gear assembly 40. The torque bias control means 44 is arranged to reduce the ordinarily expected load and power requirements imposed on the variable traction drive assembly in performing its drive ratio changing function for the over-all transmission.

As more clearly seen in FIGS. 1, 3 and 4, the power transmitting gear assembly 40 includes a differential planetary gear set 46 formed by a sun gear fixed to the inner end of the input shaft 16. The sun gear 48 is in constant mesh with planet gears 50 rotatably mounted on a carrier 52. The planet gears also mesh with an internal orbit gear 54 having external gear teeth 56 enmeshed with a floating gear train drivingly connecting the orbit gear 54 to orbit gear 64 associated with a power path combining planetary gear set 66. The gear train includes intermeshing gears 58 and 60. The parallel axes of the gears in this gear train are rotatable on a carrier 62 adapted to be retarded against rotation by a hydrostatic braking device 74 of any well known type connected to a closed fluid control circuit 22. The gear set 66 includes planet gears 68 in constant mesh with the orbit gear 64 and rotatably mounted on a carrier 70 fixed to the output shaft 18. The planet gears 68 are also in mesh with a sun gear 72 that is fixed to the carrier 52 of the differential gear set 46.

It will be apparent that the input shaft 16 will transmit torque through the gear set 46 at a drive ratio dependent on the rotational speed of the carrier 52 relative to the sun gear 48. The carrier 52 is, therefore, rotated at a lower speed than the input shaft to enable transmission of high torque through gear set 46 to the orbit gear 54 under control of a relatively low torque drive through the variable traction drive assembly 42. The power path through which low torque is transmitted to the carrier 52 for drive ratio control purposes terminates at the sun gear 72 of gear set 66 to which high torque is transmitted from orbit gear 54 through the gear train formed by gears 58, 60 and 61 when the floating gear carrier 62 is held stationary by the hydrostatic brake 74. Manual or override control over the transmission may be exercized through the hydrostatic brake by means of its fluid control circuit 22. A neutral and drive control valve assembly 24 may accordingly be associated with the fluid circuit to selectively restrict flow therein. A spring or automatically biased torque control valve 26 may also be connected in parallel with the control valve assembly 24. Shock protection is provided by an accumulator 28. A pressure sensor 29 connected to the fluid circuit will be effective to monitor the torque transmitted through the gearing and thereby supply a signal to an automatic control 30 for changing the spring tension of the device 152 in order to compensate for abrupt increases in torque loading on the transmission. Other control arrangements may, of course, be utilized for the brake device 74. A parking brake element 80 is also provided on the output shaft 18.

It will be apparent that a suitable housing will be provided for the transmission hereinbefore described, constituting the stationary frame for the gearing. The housing frame supports a fixed pivot 92 about which a slide bracket 120 is pivotally displaceable in a pivotal plane intersecting the common rotational axis of the input and output shafts. The slide bracket 120 rotatably mounts an elongated position control screw 124 by means of spaced bearings carried by the bracket 120. The screw shaft 124 is rotated by any suitable mechanism well-known in the art such as the reversible drive motor disclosed in my prior copending application aforementioned. The screw 124 is threadedly engaged with a carriage 112 as shown in FIGS. 1 and 5 for displacement of a traction roller element 110 axially along a shaft 118 to which it is splined. The shaft 118 is rotatably mounted on the bracket 120 by a bearing 90 for rotation about an axis parallel to that of the screw shaft 124. A suitable coupling joint 100 connects the spline shaft 118 to a gear 132 for transmitting a low control torque to the torque bias control means 44. Gear 132 and gear 134 with which it is enmeshed are fixed axes gears for transmitting the low torque to an orbit gear 136 associated with the torque bias control means 44. The orbit gear 136 is in constant mesh with planet gears 138 as shown in FIGS. 1 and 2, said planet gears being rotatably mounted on the same carrier 52 associated with the power transmitting gear assembly 40. A sun gear 140 fixed to the input shaft 16 meshes with the planet gear 138.

The traction roller element 110 which is of substantially constant drive diameter is held in frictional drive engagement with a variable diameter traction drive element 94 fixed to the input shaft for rotation therewith about the central rotational axis of the transmission. An adjustable tension device 152, such as that disclosed in my prior copending application aforementioned, bears agains the pivotal slide bracket 120 so as to establish the drive engaging pressure between the traction roller elements 110 and 94 at their zone of contact. The zone of contact is, of course, shifted by rotation of the screw shaft 124 so as to change the transmission drive ratio and will at the same time change the leverage ratio through which the tension device 152 exerts its force at the zone of contact. Therefore, the contact force will vary for each position of the roller element 110 in accordance with some non-linear function as depicted by curve 168 in FIG. 6. The geometry of the arrangement described is such that the minimum point 70 on the curve 168 coincides with the neutral condition of the transmission corresponding to a zero drive ratio, the drive ratio being reflected on the ordinate 162. The drive ratio is proportional to the displacement of the roller element 110 as depicted by the straight line curve 158 plotted against the roller element position on the abscissa 160.

The roller element 110 is shifted along shaft 118 between one limit position as shown in FIG. 1 at which the roller elements are of equal diameter as shown by way of example to an opposite limit position at which the diameter of roller element 94 is substantially greater than that of roller element 110 in order to vary the drive ratio in the drive assembly 42 and thereby vary the over-all transmission drive ratio as aforementioned. Ordinarily the roller elements engage each other along a straight or constant conical pitch line corresponding to the pitch angle between the rotational axes of the input shaft 16 and the roller spline shaft 118. In order to meet varying torque requirements, the pitch line along which the roller elements engage each other is varied by providing the roller element 94 with a variable pitch curvature 154. The curvature 154 may be designed to effect a change in contact pressure as a function of the transmission drive ratio. A crown curvature 156 also deviating from the basic pitch angle is provided for the roller element 110. A small amount of pivotal displacement of the roller element 110 about pivot 92 occurs during movement of the roller element 110 between its limit positions for corrective variation in the basic pitch angle from which the roller curvatures 154 and 156 deviate. The curvatures 154 and 156 are theoretically tangent to each other at the contact zone between the roller surfaces for all positions of the roller 110 to minimize slippage. Some corrective modification of the curvature 156 may also be necessary to maintain the intersection between the rotational axis of roller 94 and the pitch line at a constant distance from the pivot point of pivot 92 in order to minimize normal spin moment of traction. Such error compensation will result in some variation in the contact zone area between the engaging roller elements to affect the contact pressure for any given contact force exerted by the tension device 152 at the variable leverage aforementioned. The resultant contact pressure, dependent on such variables as the contact force, the contact zone area, the roller curvatures and the leverage ratio will vary as a function of the displacement of the roller 110 as depicted by curve 174 in FIG. 6. As shown, this resultant pressure curve 174 also has a minimum peak at the neutral position of the roller 110.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A change speed transmission comprising input and output members, power transmitting gear means directly interconnecting said input and output members for transmission of power in a relatively high torque range, traction drive means driven by the input member for selecting a variable drive ratio between said input and output members, and torque biasing means interconnected between the traction drive means and the power transmitting gear means for limiting transmission through the traction drive means to a relatively low torque range to establish said variable drive ratio.

2. The combination of claim 1 wherein said traction drive means includes a traction roller rotatable about a fixed axis a driven roller in engagement with said traction roller, means mounting the driven roller for rotation about a movable axis generally parallel to a basic pitch line along which the rollers engage, and means for displacing the driven roller along said movable axis to vary the drive ratio.

3. The combination of claim 2 wherein said rollers have engaging surfaces characterized by curvatures that deviate from the basic pitch line to maintain optimum contact pressures for all positions of the drive roller.

4. The combination of claim 3 wherein said drive ratio is varied as a function of the displacement of the driven roller.

5. The combination of claim 4 wherein said traction drive means further includes tension control means for exerting a contact force on one of the rollers at a variable leverage ratio.

6. The combination of claim 2 wherein said traction drive means further includes tension control means for exerting a contact force on one of the rollers at a variable leverage ratio.

7. The combination of claim 1 wherein said traction drive means includes engaging rollers and tension control means for exerting a contact force on one of the rollers at a variable leverage ratio.

8. The combination of claim 1 wherein said torque biasing gear means includes a reduction drive planetary gear set having input elements respectively driven by the input member and the traction drive means, and an output carrier element connected to the power transmitting gear means.

9. The combination of claim 8 wherein said power transmitting gear means includes a differential gear set having an input element connected to the input member, a planet carrier connected to the output element of the torque biasing gear means and an output element, and a power combining gear set drivingly connecting the carrier and output element of the differential gear set to the output member.

10. The combination of claim 9 wherein said traction drive means includes a drive roller driven by the input member, a driven roller, means mounting said rollers for rotation about relatively movable axes, means for displacing one of the rollers axially along the rotational axis thereof to vary the drive ratio and means for exerting a contact force on one of the rollers at a variable leverage ratio.

* * * * *